United States Patent
Takada et al.

(10) Patent No.: US 9,697,097 B2
(45) Date of Patent: Jul. 4, 2017

(54) STORAGE SYSTEM AND METHOD FOR CONTROLLING STORAGE SYSTEM

(71) Applicant: Hitachi, Ltd., Tokyo (JP)

(72) Inventors: Masanori Takada, Tokyo (JP); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 317 days.

(21) Appl. No.: 14/424,734

(22) PCT Filed: Jun. 2, 2014

(86) PCT No.: PCT/JP2014/064572
§ 371 (c)(1),
(2) Date: Feb. 27, 2015

(87) PCT Pub. No.: WO2015/186165
PCT Pub. Date: Dec. 10, 2015

(65) Prior Publication Data
US 2016/0259697 A1    Sep. 8, 2016

(51) Int. Cl.
*G06F 11/00* (2006.01)
*G06F 11/20* (2006.01)
*G06F 12/16* (2006.01)
(Continued)

(52) U.S. Cl.
CPC ........ *G06F 11/2094* (2013.01); *G06F 9/4401* (2013.01); *G06F 12/0868* (2013.01);
(Continued)

(58) Field of Classification Search
CPC ............... G06F 9/4401; G06F 11/2094; G06F 12/0868; G06F 12/16; G06F 2212/1032; G06F 2212/313
See application file for complete search history.

(56) References Cited

U.S. PATENT DOCUMENTS 6,119,209 A * 9/2000 Bauman ............... G06F 12/0895
711/118
6,192,450 B1 * 2/2001 Bauman ............... G06F 12/0804
711/133

(Continued)

FOREIGN PATENT DOCUMENTS

JP     2008-108026 A    5/2008
JP     2008-158773 A    7/2008

(Continued)

*Primary Examiner* — Joshua P Lottich
(74) *Attorney, Agent, or Firm* — Volpe and Koenig, P.C.

(57) ABSTRACT

Methods are in use for saving data stored in a volatile memory to a non-volatile memory during a power outage in a storage system so that the data on the volatile memory is not lost. In the related art, the entire data saved to the non-volatile memory is read and written in the volatile memory when electric power supply is restored. Then, an operation as the storage system is resumed and an access request from a host is accepted. In the related art, the data saved in the non-volatile memory has to be read in entirety, and thus time is required until resumption of the access request acceptance and availability is impeded. According to the invention, a cache directory and cache data are saved to a non-volatile memory during a power outage and the cache directory is copied from the non-volatile memory to a volatile memory, a storage location of the data whose storage location in the cache directory prior to the saving is the volatile memory is changed to the non-volatile memory, and host I/O processing is initiated when electric power is restored in order to address this problem.

8 Claims, 10 Drawing Sheets

(51) Int. Cl.
*G06F 12/0868* (2016.01)
*G06F 9/44* (2006.01)

(52) U.S. Cl.
CPC ...... *G06F 12/16* (2013.01); *G06F 2212/1024* (2013.01); *G06F 2212/1032* (2013.01); *G06F 2212/313* (2013.01); *G06F 2212/7201* (2013.01)

(56) References Cited

U.S. PATENT DOCUMENTS

| | | | |
|---|---|---|---|
| 8,954,673 B1* | 2/2015 | Natanzon | G06F 12/0866 711/118 |
| 2005/0091391 A1* | 4/2005 | Burton | G06F 11/2074 709/230 |
| 2005/0125607 A1* | 6/2005 | Chefalas | G06F 12/0862 711/113 |
| 2008/0082745 A1* | 4/2008 | Takada | G06F 3/061 711/113 |
| 2008/0104344 A1 | 5/2008 | Shimozono et al. | |
| 2009/0077312 A1 | 3/2009 | Miura | |
| 2011/0138221 A1 | 6/2011 | Hanaoka et al. | |
| 2011/0208998 A1 | 8/2011 | Hosaka | |
| 2011/0225345 A1 | 9/2011 | Inoue et al. | |
| 2013/0091328 A1* | 4/2013 | Yoshihara | G06F 12/0817 711/118 |
| 2013/0325824 A1* | 12/2013 | Shoens | G06F 17/30115 707/698 |

FOREIGN PATENT DOCUMENTS

| | | |
|---|---|---|
| JP | 2009-075759 A | 4/2009 |
| JP | 2011-524555 A | 9/2011 |
| JP | 2013-506885 A | 2/2013 |
| WO | 2010/016115 A1 | 2/2010 |

\* cited by examiner

Fig. 3

| Vol# | LBA | VALID | STATE | STORAGE LOCATION CLASSIFICATION | STORAGE LOCATION ADDRESS |
|---|---|---|---|---|---|
| 0 | 0x0000 | Y | Clean | VOLATILE MEMORY | 0x310000 |
| 0 | 0x0080 | N | – | – | – |
| 0 | 0x0100 | Y | Dirty | NON-VOLATILE MEMORY SAVE | 0x240000 |
| 1 | 0x0000 | Y | Clean | NON-VOLATILE MEMORY NORMAL | 0x4a0000 |
| 2 | 0x4800 | Y | Dirty | VOLATILE MEMORY | 0x370000 |

STORAGE SYSTEM AND METHOD FOR CONTROLLING STORAGE SYSTEM

TECHNICAL FIELD

The present invention relates to a storage system that serves to store information in a computer system.

BACKGROUND ART

In recent years, computer systems are playing an extensive, advanced, and important role in various types of social infrastructure. A higher performance is required for the computer systems to play the extensive and advanced role. In addition, higher reliability and higher availability are required for the computer systems to play the important role.

In order to meet the higher performance request described above, performance-improving methods for storage systems in which data is stored on a hard disk and the frequently-accessed data is temporarily stored in a volatile memory, such as a DRAM which is a storage medium higher in speed than the hard disk, have been adopted. However, the volatile memory such as the DRAM loses the data held therein when electric power supply is interrupted. In order to prevent this situation, several tiers of backups are disposed in centers that activate the storage systems in general so that the electric power supplied to the storage systems is not interrupted despite a power outage and the like. Electrical powering of the storage systems may still be interrupted nonetheless. In the case of small-scale operation, an electric power backup may not be disposed as the case may be. Given that the information stored in the storage system is important information relating to the social infrastructure and the information is not allowed to be lost in any case, the data on the volatile memory such as the DRAM must not be lost even in a case where the electrical powering of the storage system is interrupted. In the meantime, methods are in use for saving the data stored in the volatile memory such as the DRAM to a non-volatile memory such as a flash memory by using electric power of a battery mounted on the storage system in the event of an electric power supply failure (PTL 1). In this case, the reliability of the storage system can be ensured.

CITATION LIST

[Patent Literature]
[PTL 1]
US-A-2008/0104344

SUMMARY OF INVENTION

Technical Problem

The information stored in the storage system is important information relating to the social infrastructure, and thus system stoppage hampers various social activities. Accordingly, high availability is required for the storage system. In order to improve the availability, restoration has to be possible within a short period of time after the system is stopped by a failure or the like.

In the related art, the entire data saved in a non-volatile memory is read and written in a volatile memory when electric power supply is restored and then an operation as a storage system is resumed and an access request from a host is accepted.

In the related art, the saved data has to be read in entirety, and thus time is required until the access request acceptance. As a result, time is required for computer system restoration, and availability improvement is impeded.

Made in view of this problem, the invention is to shorten time taken until access request acceptance initiation from electric power supply restoration and improve availability of not only a storage system but also a computer system including the storage system.

Solution to Problem

A storage system is provided with a storage device, a control unit, a volatile memory, a non-volatile memory, and a battery. The storage device stores data, and the control unit performs data input/output processing for the storage device. The volatile memory temporarily keeps the data and keeps a cache directory which shows a storage location for the data by entry. The non-volatile memory includes a volatile cache save area and a cache directory save area, and the battery electrically powers the volatile memory in the event of a power outage. In addition, the control unit saves the cache directory from the volatile memory to the cache directory save area and saves the data from the volatile memory to the volatile cache save area during the power outage, and copies the cache directory from the cache directory save area to the volatile memory, changes the storage location of the data in the cache directory whose storage location prior to the saving is the volatile memory to the volatile cache save area, and initiates host I/O processing when electric power is resumed.

Advantageous Effects of Invention

When the invention is applied, a read amount of the non-volatile memory required for accepting an access from a host computer after electric power supply restoration can be reduced. As a result, the access from the host computer can be accepted with an operation of the storage system resumed within a reduced period of time. As a result, time taken until operation restoration of an entire computer system can be shortened, and availability of the entire computer system can be improved.

BRIEF DESCRIPTION OF DRAWINGS

FIG. 3 is a diagram illustrating an example of a configuration of a cache directory 8 according to the invention.

DESCRIPTION OF EMBODIMENTS

Figure 1:
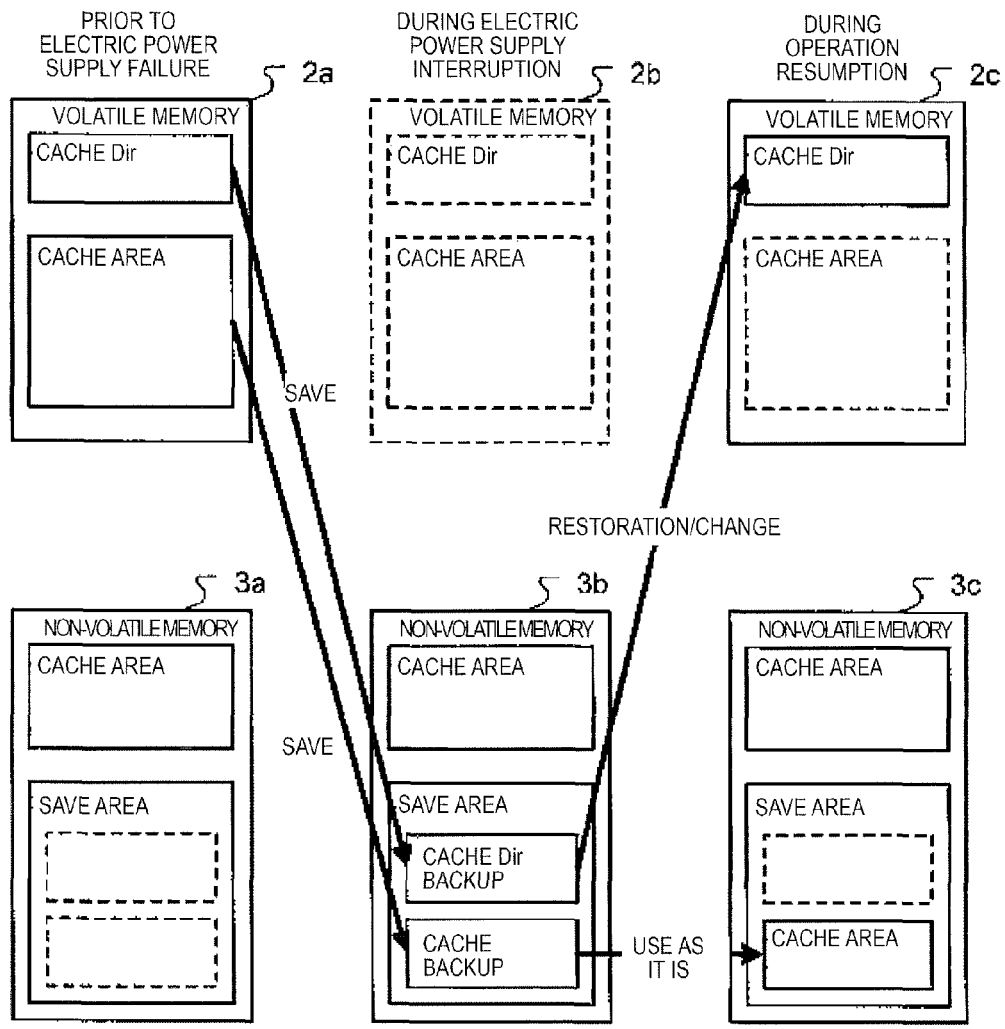
FIG. 1 is a schematic diagram illustrating an example of data saving processing and restoration processing according to a first embodiment of the invention.

Hereinafter, embodiments of the present invention will be described with reference to accompanying drawings. The embodiments are just examples for realizing the present invention, and it should be noted that the embodiments do not limit the technical scope of the present invention. The same reference numerals are attached to common configurations in the drawings.

First Embodiment

In a first embodiment, only write data (dirty data) from a host computer is restored when data that is saved in a non-volatile memory is restored onto a volatile memory so that time required for the processing is shortened. FIG. 1 is a schematic diagram of this embodiment. The drawing illustrates examples of a volatile memory 2, a non-volatile memory 3, and a cache directory 8 prior to an electric power supply failure, at a time of an electric power supply interruption, and at a time of an operation resumption.

A content of a cache directory 8a is stored in a cache directory (cache Dir) in a volatile memory 2a prior to the electric power supply failure. Data sent to and received from the host computer is stored in a cache area on the volatile memory 2a. Data sent to and received from the host computer is stored in a cache area of a non-volatile memory 3a as is the case with the cache area of the volatile memory 2a. No particular data is stored in a save area of the non-volatile memory 3a.

Corresponding data is stored, for each volume number (Vol#) and logical address (logical block address, LBA), in any one of the volatile memory (volatile memory, VM) and the non-volatile memory (non volatile memory, NVM) and storage location address (Addr) information is stored in the cache directory 8a. In this example, the data of volume 0 and LBA 0 is stored at address 0x0462 of the volatile memory and the data of volume 0 and LBA 1 is stored at address 0xaf34 of the non-volatile memory. The data of volume 1 and LBA 0 is illustrated not to be present on the cache area.

When the electric power supply failure occurs, the cache directory on the volatile memory and the data on the cache area are saved in a backup area on the non-volatile memory 3. Typically, the backup area has the same capacity as the cache area and the data in the cache area is copied to the save area as it is. As a result, a volatile memory 2b is in a state where no data is stored during the disconnection of the electric power supply. A backup of the cache directory and a backup of the data stored in the cache area of the volatile memory 2a are stored in a save area of a non-volatile memory 3b. A content of a cache directory 8b is similar to that prior to the electric power supply failure.

Contents of the volatile memory, the non-volatile memory, and the cache directory at a time of the operation resumption are 2c, 3c, and 8c, respectively. A partial modification of the content of the cache directory saved on the non-volatile memory is stored on the volatile memory 2c. No data is stored in a cache area of the volatile memory 2c. Data is stored, as is prior to the electric power supply failure, in a cache area on the non-volatile memory 3c. An area of the save area that is used for cache backup is used as a cache area as it is.

In the cache directory 8c, a storage location is changed to point the save area of the non-volatile memory for an entry whose storage location is the volatile memory. In this example, the data of volume 0 and LBA 0 is changed to point the save area of the non-volatile memory (address 0x462). Typically, the data of the cache area is copied to the save area as it is, and thus a storage location classification may be changed from the volatile memory to the save area of the non-volatile memory with the address remaining as it is.

Figure 2:
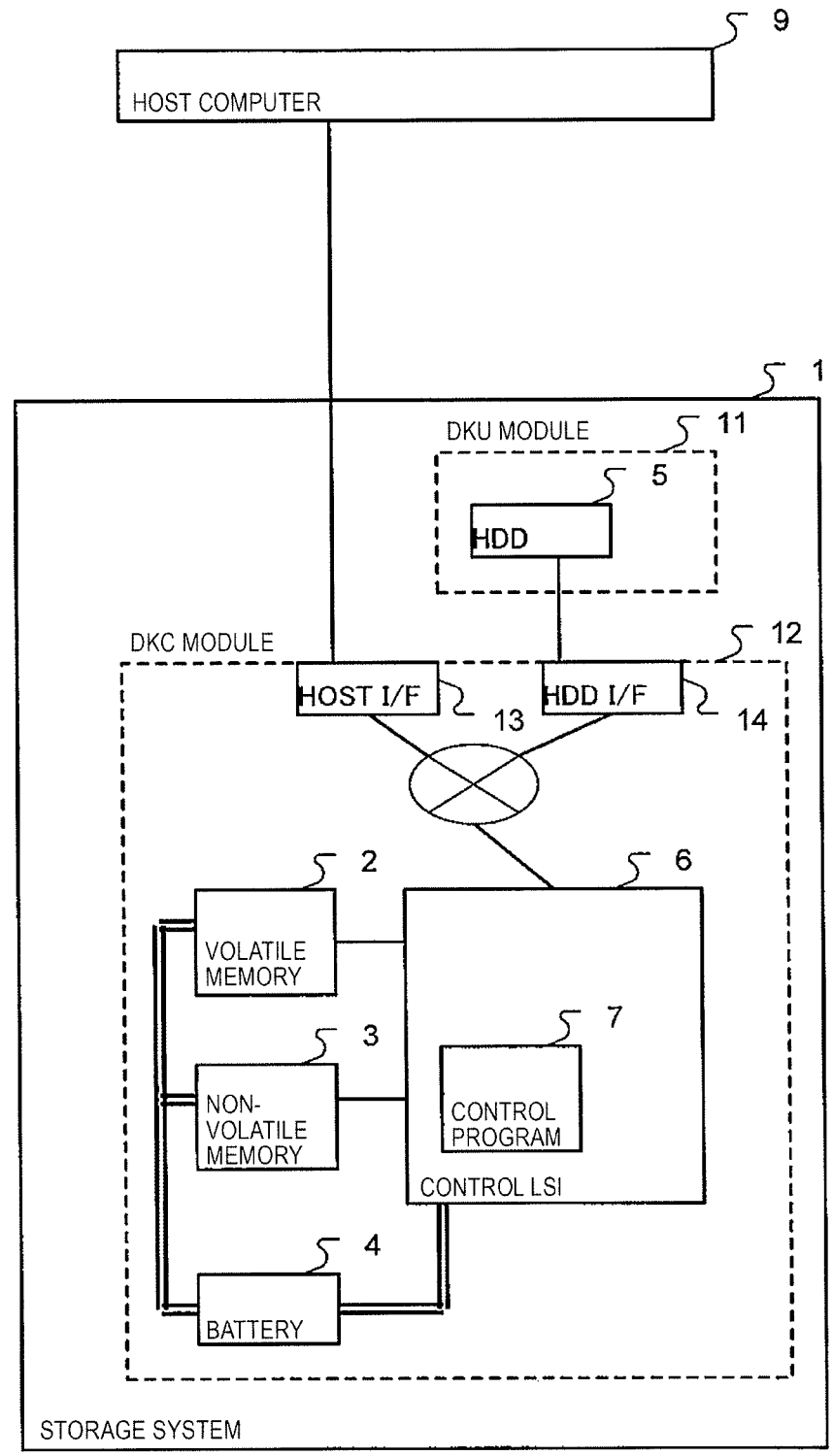
FIG. 2 is a diagram illustrating an example of a storage system to which the invention is applied and a computer system including same.

FIG. 2 is a diagram illustrating an example of a storage system to which the invention is applied and a computer system including same. A host computer 9 and a storage system 1 constitute the computer system. A disk unit module (DKU module) 11 and a disk control module (DKC module) 12 constitute the storage system 1. The disk unit module (DKU module) 11 has a drive 5, and the disk control module (DKC module) 12 has the volatile memory 2, the non-volatile memory 3, a battery 4, a host interface (HOST I/F) 13, an HDD interface (HDD I/F) 14, and a control LSI 6. The host interface 13 is configured as a first interface section that performs information exchange with the host computer 9 and controls data transmission between the host computer 9 and the volatile memory 2. The HDD interface is configured as a second interface section that is connected to the drive 5 and performs data input/output processing for the drive 5. The storage system 1 may be configured not to have the disk unit module (DKU module) 11 and the disk control module (DKC module) 12, and the volatile memory 2, the non-volatile memory 3, the battery 4, the control LSI 6, and the drive 5 may be configured to be in the same module.

The control LSI 6 controls the storage system 1 and is used also as a data transmission path for data exchange. A plurality of LSIs may constitute the control LSI 6. On the control LSI 6, a control program 7 is in operation to perform an operation following a request from the host computer 9 and perform saving processing against the electric power supply failure or the like, processing for electric power supply restoration, and the like. Herein, the saving processing against the electric power supply failure may be executed by, for example, a microcomputer for saving that is present separately from the control LSI 6 in the disk control module (DKC module) 12, is electrically powered by the battery 4, and is connected to the volatile memory 2 and the non-volatile memory 3.

The drive 5 is used to store the data that is received from the host computer. Typically, a hard disk is used in most cases. However, a solid state drive (SSD) or the like may also be used, and a plurality of types may also be combined. The volatile memory 2 temporarily stores the data that is exchanged between the drive 5 and the host computer 9 and is also used to store the data required for operating the control program 7.

Typically, the volatile memory 2 is a dynamic random access memory (DRAM). However, the volatile memory 2 may be another medium that shows an excellent reading and writing performance. The non-volatile memory 3 temporarily stores the data that is exchanged between the drive 5 and the host computer 9 and is also used to save the data on the volatile memory 2 during the electric power supply failure or the like.

Typically, the non-volatile memory 3 is a NAND flash memory. However, the non-volatile memory 3 may be another non-volatile and large-capacity medium such as a magnetic random access memory (MRAM) and a phase change memory (PCM). The battery 4 is used to temporarily support electric power supply for the control LSI 6, the volatile memory 2, and the non-volatile memory 3 during the electric power supply failure so that the saving operation described above is performed. Typically, the battery is a nickel-metal hydride battery or a lithium ion battery. However, the battery may also be large-capacity capacitor type such as a super capacitor.

FIG. 3 illustrates an example of a configuration of the cache directory 8. The cache directory 8 is used to determine whether the data requested from the host computer 9 is stored in the volatile memory 2 and the non-volatile memory 3 and manage a destination of the storage location in a case where the data requested from the host computer 9 is stored in the volatile memory 2 and the non-volatile memory 3.

A set of entries including a volume number (Vol#) 81, a logical address (LEA) 82, a valid flag 83, a state 84, a storage location memory classification 85, and a storage location address 86 constitutes the cache directory 8. The volume number 81 and the logical address 82 are identifiers for an access location for reading and writing from the host computer 9. The valid flag 83 shows whether data of the corresponding access location is stored on the memory. The state 84 shows whether the data matches a content of the drive 5 in a case where the entry is valid. For example, it is shown that the data matches the content of the drive 5 in a case where the state 84 is Clean. Accordingly, the data does not have to be written in the drive 5, and the data can be read back from the drive 5 even when the data is lost.

In a case where the state 84 is Dirty, it is shown that the data is sent from the host computer 9 but has yet to be written in the drive 5. Accordingly, the data has to be written in the drive 5 and cannot be restored in a case where the data is lost. The storage location memory classification 85 shows whether the storage location is the volatile memory 2 or the non-volatile memory 3 in a case where the data is present on a cache memory. In addition, the storage location memory classification 85 shows whether the storage location is a non-volatile cache area 31 (described later) or a volatile cache save area 34 in a case where the storage location is the non-volatile memory 3. The storage location address 86 shows an address of the memory where the data is stored. This address may be an address where a lead of each area is address 0 and an address where a lead of the memory is address 0 in each of the volatile memory 2 and the non-volatile memory 3.

Figure 4:
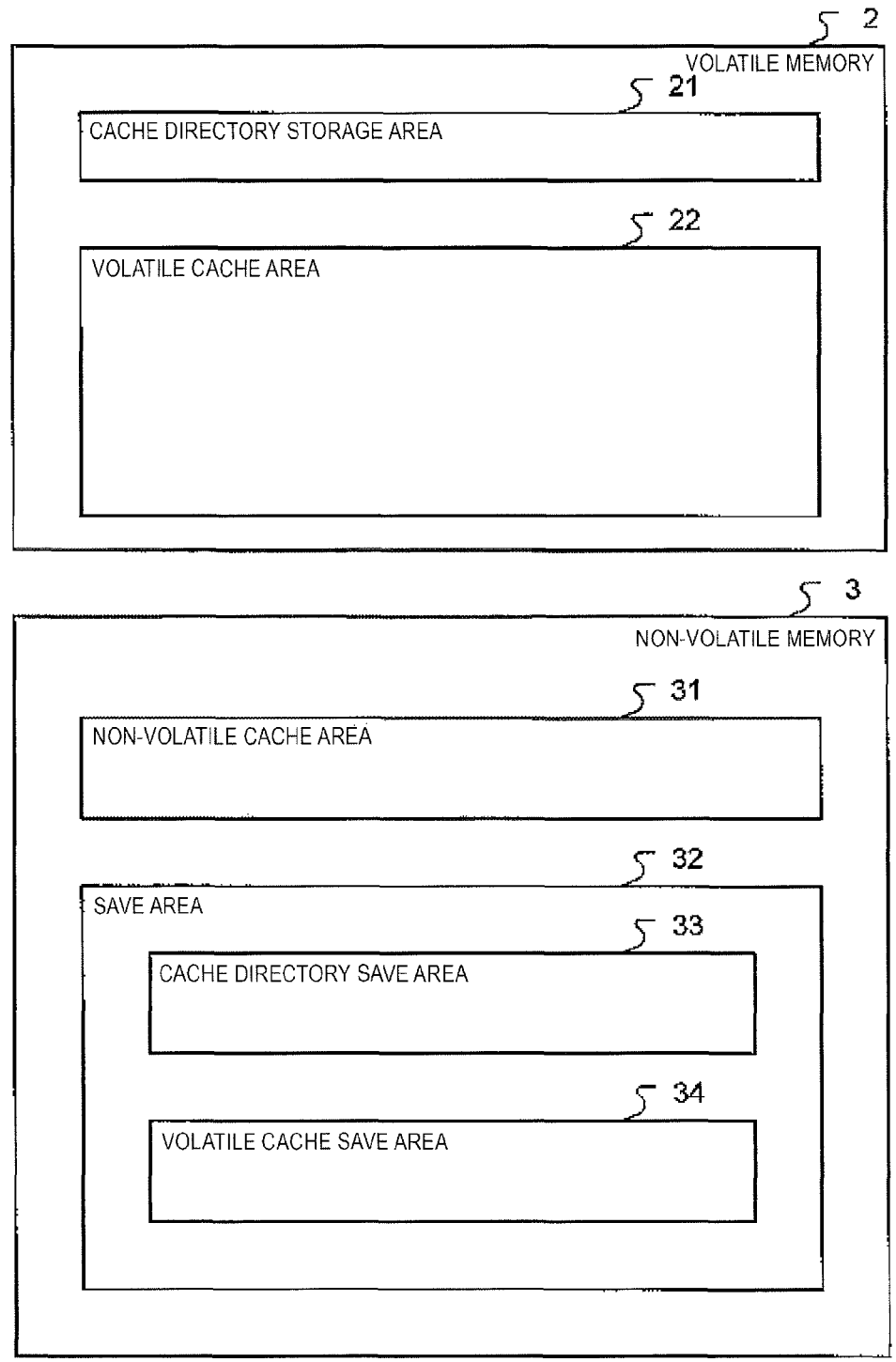
FIG. 4 is a diagram illustrating configurations of memory spaces on a volatile memory and a non-volatile memory according to the first embodiment of the invention.

FIG. 4 is a diagram illustrating configurations of memory spaces on the volatile memory 2 and the non-volatile memory 3 according to this embodiment.

A cache directory storage area 21 and a volatile cache area 22 constitute the volatile memory 2. The cache directory 8 described above is stored in the cache directory storage area 21. Data read and written from the host computer 9 is stored in a volatile cache area 22.

The non-volatile cache area 31 and a save area 32 constitute the non-volatile memory 3. As is the case with the volatile cache area 22, data read and written from the host computer 9 is stored in the non-volatile cache area 31. A cache directory save area 33 and the volatile cache save area 34 also constitute the save area 32. The cache directory save area 33 is used to store a content of the cache directory storage area 21 in a case where a content of the volatile memory 2 cannot be held due to the electric power supply failure or the like. Likewise, the volatile cache save area 34 is used to save a content of the volatile cache area 22.

Figure 5:
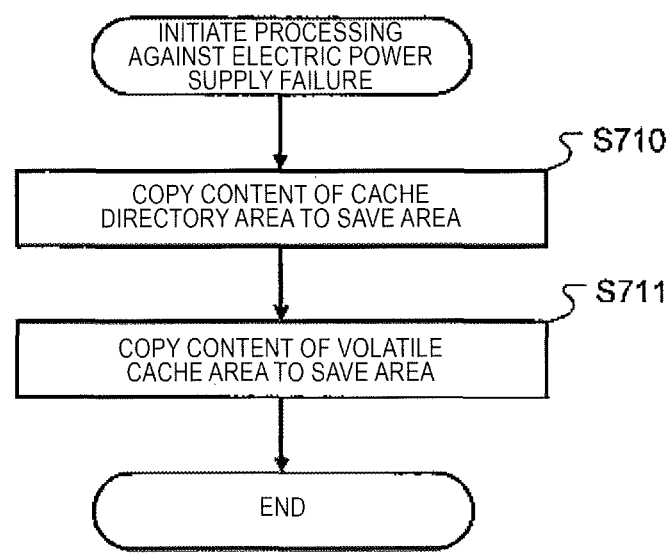
FIG. 5 is a diagram illustrating an example processing against an electric power supply failure according to the first embodiment of the invention, which is executed by a control LSI in a case where the electric power supply failure occurs.

FIG. 5 illustrates an example of processing 71 against the electric power supply failure according to this embodiment, which is executed by the control LSI in a case where the electric power supply failure occurs.

After the electric power supply failure occurs, the control LSI first copies the content of the cache directory storage area 21 to the cache directory save area 33 (S710). Then, the content of the volatile cache area 22 is similarly copied to the volatile cache save area 34 (S711), and the processing is terminated. Herein, the content of the volatile cache area 22 may be partially copied to the volatile cache save area 34 in S711. For example, the processing may be terminated after only the Dirty-state data of the content of the volatile cache area 22 is copied to the volatile cache save area 34.

Figure 6:
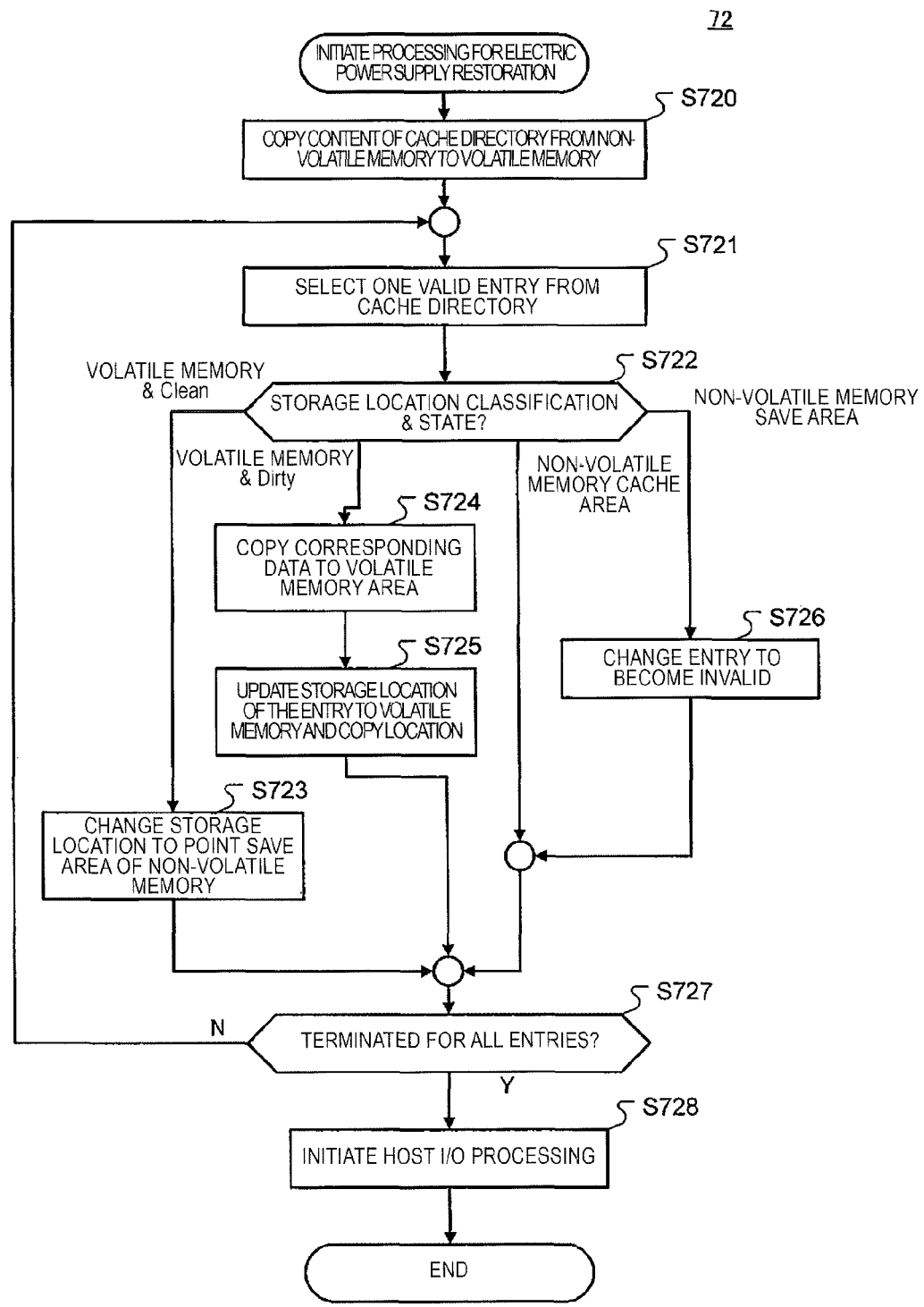
FIG. 6 is a diagram illustrating an example of processing for electric power supply restoration according to the first embodiment of the invention, which is executed by the control LSI in a case where the electric power supply is restored.

FIG. 6 illustrates an example of processing 72 for electric power supply restoration according to this embodiment, which is executed by the control LSI in a case where the electric power supply is restored.

After the electric power supply is restored, the control LSI first copies a content of the cache directory save area 33 to the cache directory storage area 21 so that the content of the cache directory is restored (S720). Then, one valid entry of the cache directory 8 is selected (S721). Then, the storage location memory classification 85 and the state 84 of the entry are checked (S722).

In a case where the storage location is the volatile memory and the state is Clean, the data is stored in the volatile cache save area 34 on the non-volatile memory 3. Data holding is not affected even when the data is lost. Then, the storage location 85 is changed to the non-volatile memory 3 and the storage location address 86 is changed to point a corresponding area of the volatile cache save area 34 (S723) for the entry of the cache directory 8. In this manner, the data is not restored in the volatile memory 2 but is present on the non-volatile memory 3 and the operation can be resumed.

In a case where the storage location is the volatile memory and the state is Dirty in S722, the data is stored in the volatile cache save area 34 on the non-volatile memory 3. The data has to be written back to the drive and must not be lost. Accordingly, the corresponding data is copied to a volatile memory area (S724) so that no problem occurs even when the volatile cache save area 34 is overwritten due to an additional electric power supply failure. Then, the storage location 85 is updated to the volatile memory 2 and the storage location address 86 is updated to the address of the location copied in S724 (S725) for the entry of the cache directory 8. In this manner, the data is copied onto the volatile cache area 22 and can be prevented from being lost even when the volatile cache save area 34 is overwritten due to the additional electric power supply failure.

In a case where the storage location is the non-volatile memory and the save area in S722, the data is overwritten by another data in the saving processing although the data is stored in the volatile cache save area 34 before the electric power supply failure occurs. Accordingly, the entry is changed to become invalid (S727). In this manner, the entry of the data actually not stored in the volatile cache save area 34 due to the data overwriting can be prevented from becoming valid on the cache directory 8.

In a case where the storage location is the non-volatile memory and the cache area in S722, the data is kept as it is, and thus no particular processing is performed and the processing proceeds to S727 as it is.

The processing from S721 to S726 described above is repeated for all of the entries (S727). Then, host I/O processing is initiated (S728), and the processing for restoration is terminated.

The processing described above allows the Clean data in the volatile cache save area 34 that may be lost to be used as the cache as it is and the Dirty data in the volatile cache save area 34 that must not be lost to be restored back on the volatile cache area 22. In addition, the volatile cache save area 34 can be used as a save location during the additional electric power supply failure. In this manner, reliability similar to that in the related art can be ensured and a copy amount required for the restoration from the electric power supply failure can be reduced. As a result, time taken until the restoration can be shortened and device availability is improved.

The processing according to the flowchart in FIG. 6 may not be executed in entirety in order to shorten the time taken until the restoration and improve the device availability by reducing the copy amount required for the restoration from the electric power supply failure. For example, the entry whose storage location classification is the volatile memory may not be subjected to Clean-Dirty state distinction after S721, and the storage location may be changed to point the save area of the non-volatile memory before proceeding to S727.

Figure 7:
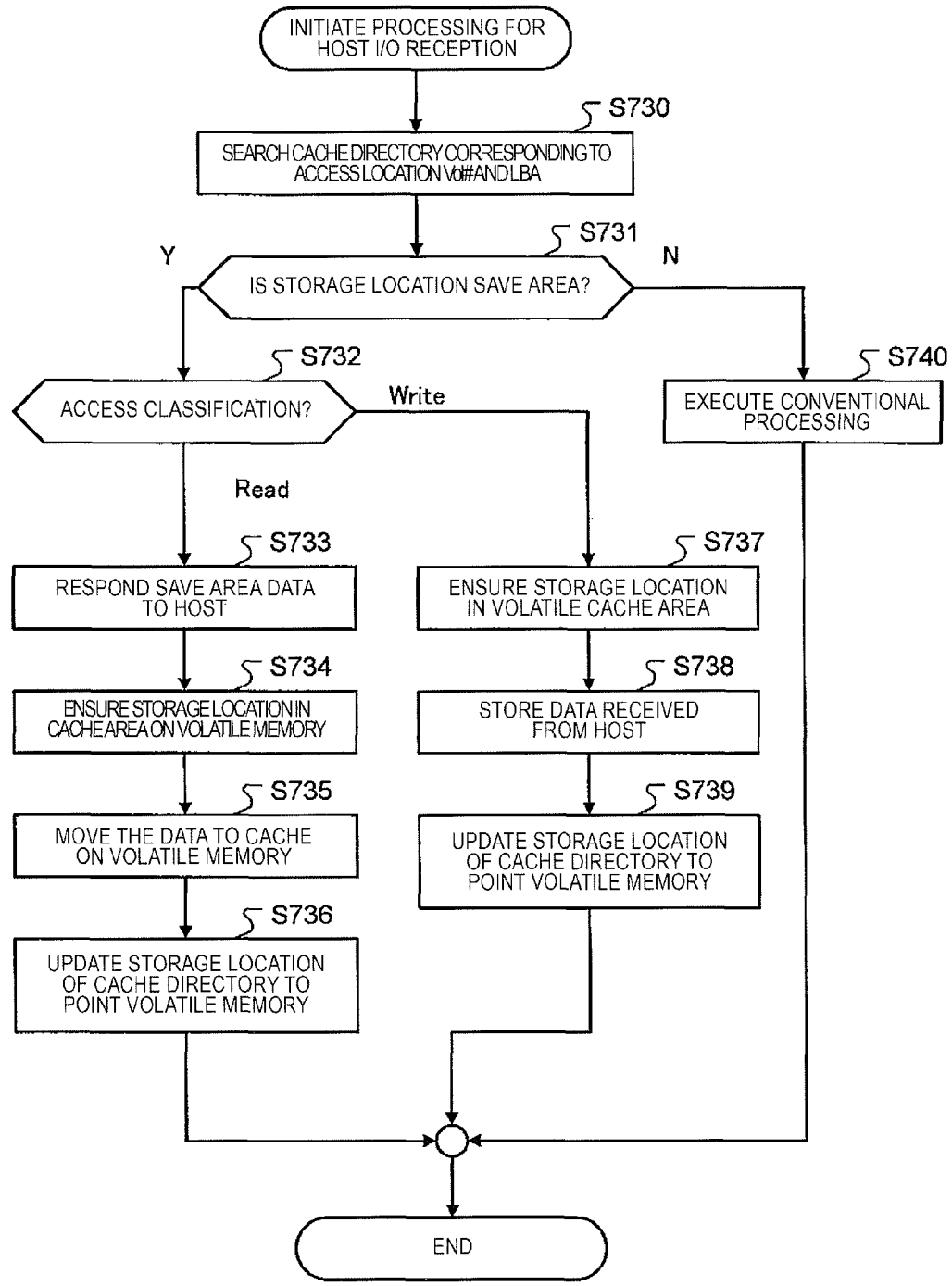
FIG. 7 is a diagram illustrating an example of processing for host I/O reception according to the first embodiment of the invention.

FIG. 7 illustrates an example of processing for host I/O reception according to this embodiment.

After a host I/O request is received, the entry of the cache directory 8 corresponding to an access location volume number and the LBA is first searched (S730). Then, it is determined whether the storage location is the volatile cache save area 34 (S731). In a case where the storage location is the volatile cache save area 34, an access classification of the I/O request from the host computer is determined (S732).

In a case where the request is a read request, the data of the volatile cache save area 34 is responded to the host (S733). Then, the storage location of the data is ensured on the volatile cache area 22 (S734), and the data is moved to the volatile cache area 22 (S735). Then, the storage location is changed to the volatile cache area 22 and the storage location address is changed to point the area ensured in S734 for the entry of the cache directory 8 (S736).

In a case where the access classification is a write request in S732, the storage location is ensured on the volatile cache area 22 (S737). Then, the data received from the host computer 9 is stored in the ensured area (S738). Then, the storage location is updated to point the volatile cache area and the address is updated to point the area ensured in S737 for the entry of the cache directory 8 (S739).

In a case where the storage location is not the volatile cache area 22 in S731, conventional processing is performed (S740).

In this manner, even the data stored in the volatile cache save area 34 can be moved, triggered by the host I/O, to the normal volatile cache area 22 and the non-volatile cache area 31. As a result, the area used on the volatile cache area 34 can be decreased with time, the cache data discarded in a case where the additional electric power supply failure occurs can be decreased, and a cache hit ratio immediately after the restoration from the electric power supply failure is increased by a margin of the cache data moved, without being discarded, to the volatile cache save area 22 and the non-volatile cache area 31. As a result, an I/O performance immediately after the restoration from the electric power supply failure can be improved.

Second Embodiment

A second embodiment is an example in which a plurality of the volatile cache save areas are disposed so that the time taken required for the restoration from the electric power supply failure can be further reduced. Hereinafter, differences between the first embodiment and the second embodiment will be described.

Figure 8:
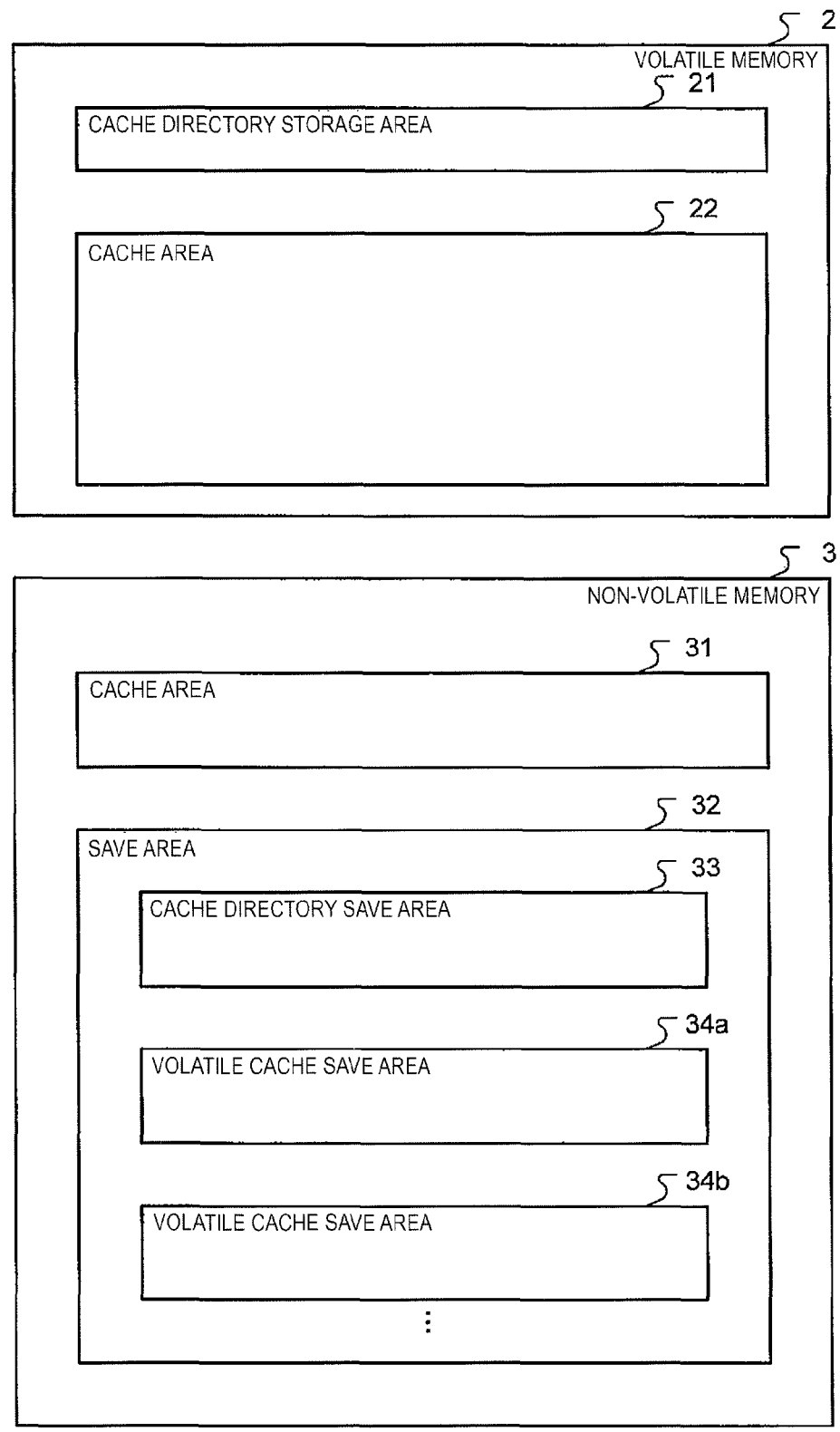
FIG. 8 is a diagram illustrating configurations of memory spaces on a volatile memory and a non-volatile memory according to a second embodiment of the invention.

FIG. 8 illustrates the configurations of the memory spaces on the volatile memory 2 and the non-volatile memory 3 according to this embodiment.

In this embodiment, a plurality of volatile cache save areas 34a, 34b, . . . are provided on the save area 32 of the non-volatile memory 3. The other configurations are identical to those of the first embodiment.

In this case, the vacant volatile cache save areas can be used even when the electric power supply failure occurs on repeated occasions. Accordingly, the data on the volatile cache save area 34 does not have to be moved to another area insofar as the vacancy is present.

Figure 9:
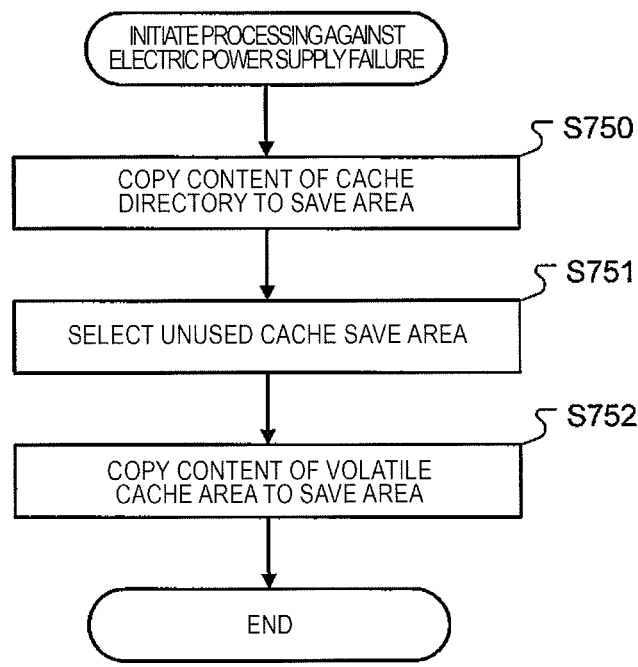
FIG. 9 is a diagram illustrating an example of processing against an electric power supply failure according to the second embodiment of the invention, which is executed by a control LSI in a case where the electric power supply failure occurs.

FIG. 9 illustrates an example of processing 75 against the electric power supply failure according to this embodiment, which is executed by the control LSI in a case where the electric power supply failure occurs.

After the electric power supply failure occurs, the control LSI first copies the content of the cache directory storage area 21 to the cache directory save area 33 (S750). Then, one unused cache save area 34 is selected (S751). Then, the content of the volatile cache area 22 is copied to the selected cache save area 34 (S752), and the processing is terminated.

Figure 10:
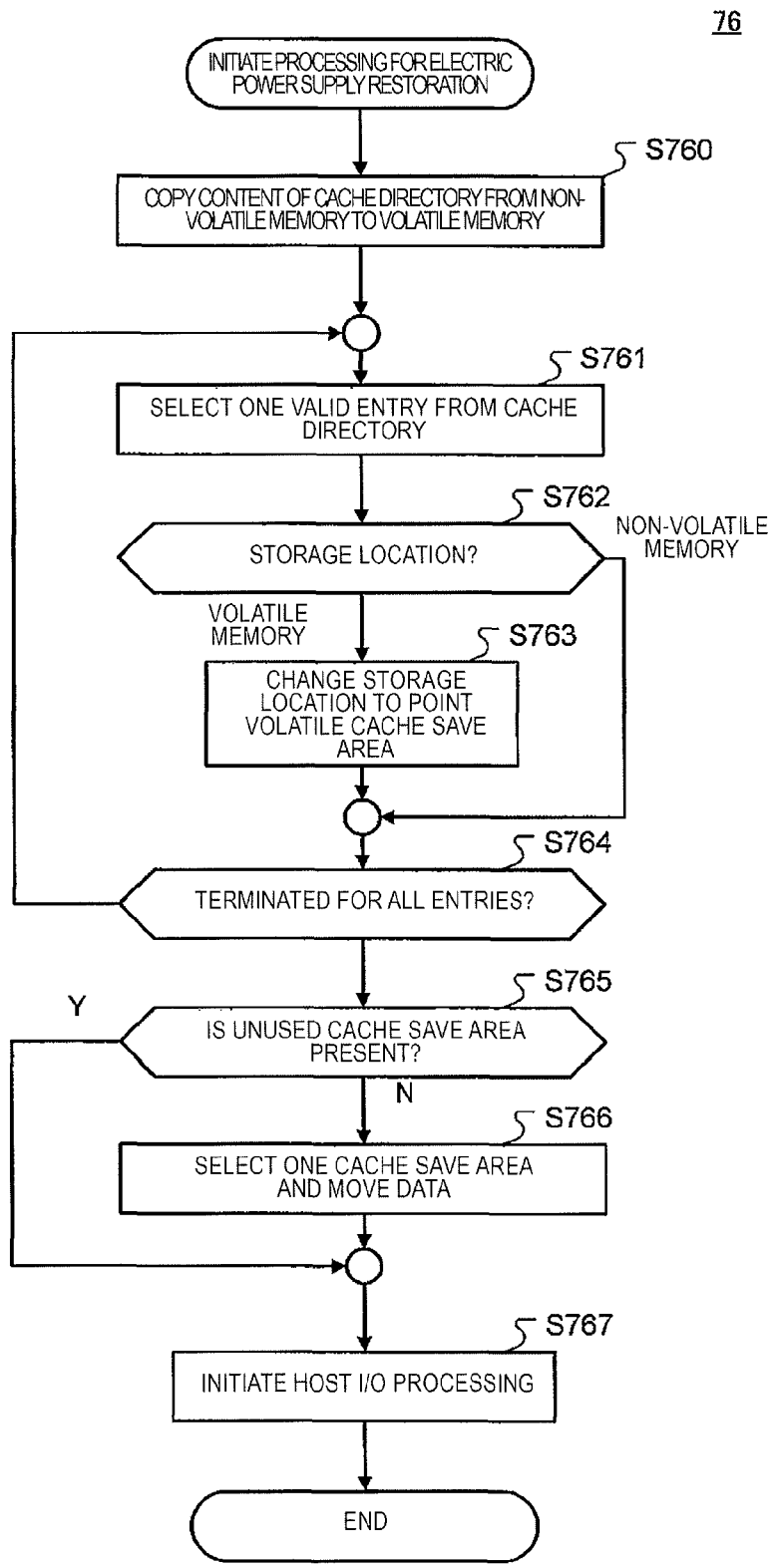
FIG. 10 is a diagram illustrating an example of restoration processing according to the second embodiment of the invention, which is executed by the control LSI when electric power supply is restored.

FIG. 10 illustrates an example of restoration processing 76 according to this embodiment, which is executed by the control LSI when electric power supply is restored.

After the electric power supply is restored, the control LSI first copies the content of the cache directory save area 33 to the cache directory area 22 on the volatile memory 2 (S760). Then, one entry is selected from the cache directory 8 (S761) and the storage location is determined (S762). In a case where the storage location is the volatile memory 2, the data is moved to the volatile cache save area, and thus the storage location is changed to point the volatile cache save area (S763). In a case where the storage location is the non-volatile memory 3 in S762, the data is held as it is, and the processing proceeds to S764 with nothing performed at all.

Then, it is determined whether the processing from S761 to S763 is performed for all of the entries (S764). The processing returns to S761 in a case where an unprocessed entry is present. The processing proceeds to S765 at a point of time when the processing is terminated for all of the entries.

Then, it is determined whether an unused area is present in the plurality of volatile cache save areas 34 (S765). In a case where the unused area is not present, one of the volatile cache save areas 34 is selected, and the data on the area is copied to the volatile cache area 22. Then, the storage location of the moved data is changed to the volatile memory 2 for each of the entries of the cache directory 8 (S766). In a case where the unused cache save area is present in S765, the processing proceeds to S767 as it is. Lastly, the host I/O processing is initiated (S767), and the processing is terminated.

In a case where the unused cache save area is present, the host I/O processing can be resumed without performing user data copy. In addition, in a case where an interval between the electric power supply failures is sufficient, the data stored in the volatile cache save area 34 is moved to the normal volatile cache area 22 and the non-volatile cache area 31, triggered by the I/O from the host, through the processing illustrated in FIG. 7, and thus the valid data on the volatile cache save area 34 disappears with time and the volatile cache save area 34 is put in an unused state. Accordingly, the data movement processing of S762 does not substantially occur. In this manner, down time at a time of the electric power supply failure can be further reduced, and the availability of the storage system 1 can be improved.

As described above, both the first embodiment and the second embodiment are capable of reducing a required read amount of the non-volatile memory compared to a case where the data saved from the volatile memory 2 to the non-volatile memory 3 during a power outage is stored from the non-volatile memory 3 to the volatile memory 2 in entirety when the electric power is restored. As a result, an operation of the storage system can be resumed within a shorter length of time so that an access from the host computer can be accepted. In other words, according to the invention, I/O performance improvement can be achieved from temporary storage of the data to the volatile memory and reliability can be achieved from the absence of loss of the data on the volatile memory, despite interruption of the electric power supply to the storage system, while the availability can be achieved from a quick operation resumption after the electric power restoration.

REFERENCE SIGNS LIST

1 Storage system
2 Volatile memory
3 Non-volatile memory
4 Battery
5 Drive
6 Control LSI
7 Control program
8 Cache directory
9 Host computer

The invention claimed is:

1. A storage system comprising:
a storage device that stores data;
a control unit that performs input/output processing on the data for the storage device according to a request from a host computer;
a volatile memory that temporarily keeps the data and keeps a cache directory which shows a storage location for the data by entry;
a non-volatile memory that includes a volatile cache save area and a cache directory save area; and
a battery that electrically powers the volatile memory during an electric power interruption when electric power supply to the volatile memory is interrupted,
wherein the control unit saves the cache directory from the volatile memory to the cache directory save area and saves the data from the volatile memory to the volatile cache save area during the electric power interruption, and copies the cache directory from the cache directory save area to the volatile memory, changes the storage location of the data in the cache directory whose storage location prior to the saving is the volatile memory to the volatile cache save area, and initiates host I/O processing when the electric power supply is resumed,
wherein the cache directory also stores whether or not the data is stored in the storage device by entry, and
wherein the control unit copies the cache directory to the non-volatile memory, copies the data whose storage location prior to the saving is the volatile memory and which is not stored in the storage device from the non-volatile memory to the volatile memory, changes the storage location of the copied data in the cache directory to the copy location, and initiates the host I/O processing when the electric power supply is resumed.

2. The storage system according to claim 1,
wherein the cache directory also stores whether the entry is valid or invalid by entry, and
wherein the control unit changes the entry whose data storage location is the volatile cache save area to become invalid in the directory prior to the change of the directory and initiates the host I/O processing when the electric power supply is resumed.

3. The storage system according to claim 1,
wherein the control unit responds data to a host when a read request for the data stored in the volatile cache save area is received from the host, copies the data to the volatile memory, and changes the storage location of the data to a destination of the copy location in the cache directory after the initiation of the host I/O processing, and
wherein the control unit stores data associated with a write request to the volatile memory when the write request for the data stored in the volatile cache save area is received from the host and changes the storage location of the data in the cache directory to a storage location of the data associated with the write request after the initiation of the host I/O processing.

4. The storage system according to claim 1,
wherein the non-volatile memory includes a plurality of volatile cache save areas,
wherein the control unit saves the data from the volatile memory to an unused one of the plurality of volatile cache save areas during the electric power interruption, and
wherein the control unit copies the data stored in one of the plurality of volatile cache save areas to the volatile memory, changes the storage location of the data to a destination of the copy location in the cache directory, and initiates the host I/O processing after the electric power supply is resumed in a case where the unused volatile cache save area is not present.

5. A method for controlling a storage system including a storage device that stores data, a control unit that performs input/output processing on the data for the storage device according to a request from a host computer, a volatile memory that temporarily keeps the data and keeps a cache directory which shows a storage location for the data by entry, a non-volatile memory that includes a volatile cache save area and a cache directory save area, and a battery that electrically powers the volatile memory during an electric power interruption when electric power supply to the volatile memory is interrupted, the method comprising:
a step for saving the cache directory from the volatile memory to the cache directory save area and saving the data from the volatile memory to the volatile cache save area during the electric power interruption, and copying the cache directory from the cache directory save area to the volatile memory, changing the storage location of the data in the cache directory whose storage location prior to the saving is the volatile memory to the volatile cache save area, and initiating host I/O processing when the electric power supply is resumed, wherein the cache directory also stores whether or not the data is stored in the storage device by entry, and wherein the cache directory is copied to the non-volatile memory, the data whose storage location prior to the saving is the volatile memory and which is not stored in the storage device is copied from the non-volatile memory to the volatile memory, the storage location of the copied data in the cache directory is changed to the copy location, and the host I/O processing is initiated when the electric power supply is resumed.

6. The method for controlling a storage system according to claim 5, wherein the cache directory also stores whether the entry is valid or invalid by entry, and wherein the entry whose data storage location is the volatile cache save area is changed to become invalid in the directory prior to the change of the directory and the host I/O processing is initiated when the electric power supply is resumed.

7. The method for controlling a storage system according to claim 5, wherein data is responded to a host when a read request for the data stored in the volatile cache save area is received from the host, the data is copied to the volatile memory, and the storage location of the data is changed to a destination of the copy location in the cache directory after the initiation of the host I/O processing, and wherein data associated with a write request is stored to the volatile memory when the write request for the data stored in the volatile cache save area is received from the host and the storage location of the data in the cache directory is changed to a storage location of the data associated with the write request after the initiation of the host I/O processing.

8. The method for controlling a storage system according to claim 5, wherein the non-volatile memory includes a plurality of volatile cache save areas, wherein the data is saved from the volatile memory to an unused one of the plurality of volatile cache save areas during the electric power interruption, and wherein the data stored in one of the plurality of volatile cache save areas is copied to the volatile memory, the storage location of the data is changed to a destination of the copy location in the cache directory, and the host I/O processing is initiated after the electric power supply is resumed in a case where the unused volatile cache save area is not present.

\* \* \* \* \*